United States Patent
Li et al.

(10) Patent No.: US 10,989,318 B2
(45) Date of Patent: Apr. 27, 2021

(54) SHUNT VALVE FOR A BIDET AND A TOILET COVER PLATE INCLUDING THE SHUNT VALVE

(71) Applicant: XIAMEN AQUATOWN TECHNOLOGY CO., LTD, Xiamen (CN)

(72) Inventors: Junxin Li, Xiamen (CN); Zhanxian Chen, Xiamen (CN)

(73) Assignee: XIAMEN AQUATOWN TECHNOLOGY CO., LTD, Xiamen (CN)

( * ) Notice: Subject to any disclaimer, the term of this patent is extended or adjusted under 35 U.S.C. 154(b) by 0 days.

(21) Appl. No.: 16/981,702

(22) PCT Filed: Jul. 22, 2019

(86) PCT No.: PCT/CN2019/097157
§ 371 (c)(1),
(2) Date: Sep. 17, 2020

(87) PCT Pub. No.: WO2020/020108
PCT Pub. Date: Jan. 30, 2020

(65) Prior Publication Data
US 2021/0088148 A1 Mar. 25, 2021

(30) Foreign Application Priority Data

Jul. 25, 2018 (CN) .......................... 201810824946.8

(51) Int. Cl.
*F16K 11/074* (2006.01)
*E03D 9/08* (2006.01)

(52) U.S. Cl.
CPC ............ *F16K 11/0743* (2013.01); *E03D 9/08* (2013.01)

(58) Field of Classification Search
CPC ............................. F16K 11/0743; E03D 9/08
See application file for complete search history.

(56) References Cited

FOREIGN PATENT DOCUMENTS

| CN | 105299262 A | 2/2016 |
|----|-------------|--------|
| CN | 206929380 U | 1/2018 |
| CN | 207073601 U | 3/2018 |
| CN | 108644416 A | 10/2018 |
| CN | 208804284 U | 4/2019 |
| JP | 6066456 B2 | 1/2017 |
| JP | 2017190665 A | 10/2017 |
| KR | 20090076577 A | 7/2009 |

*Primary Examiner* — Christine J Skubinna
(74) *Attorney, Agent, or Firm* — Bayramoglu Law Offices LLC (57) ABSTRACT

A shunt valve for a bidet includes a valve body and a valve core. The valve body is provided with a water inlet port and a water outlet port. The valve core includes a movable valve plate and a fixed valve plate. The movable valve plate and the fixed valve plate abut against each other, and are rotatably matched with each other. The water outlet port includes a washing water outlet port and a self-cleaning water outlet port. The fixed valve plate is provided with a washing water outlet hole communicating with the washing water outlet port and a self-cleaning water outlet hole communicating with the self-cleaning water outlet port. The movable valve plate is provided with an overflowing hole communicating with the water inlet port. A toilet cover plate including the shunt valve is provided.

20 Claims, 7 Drawing Sheets

SHUNT VALVE FOR A BIDET AND A TOILET COVER PLATE INCLUDING THE SHUNT VALVE

CROSS REFERENCE TO THE RELATED APPLICATIONS

This application is the national phase entry of International Application No. PCT/CN2019/097157, filed on Jul. 22, 2019, which is based upon and claims priority to Chinese Patent Application No. 201810824946.8, filed on Jul. 25, 2018, the entire contents of which are incorporated herein by reference.

TECHNICAL FIELD

The present invention relates to a shunt valve for a bidet and a toilet cover plate including the shunt valve.

BACKGROUND

A toilet cover plate for washing the human body is generally provided with a bidet. The bidets are typically designed to provide a washing function for a feminine's vulva, a buttock washing function and a self-cleaning function. Water flow through the bidet is directed by a shunt valve having different valve groups to achieve the different washing/cleaning functions.

Figure 1:
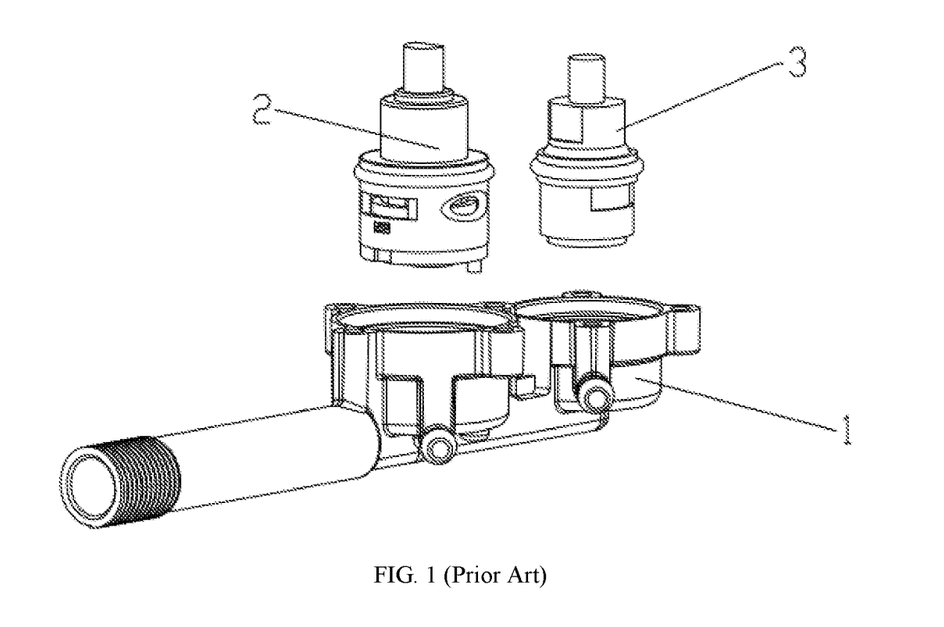
FIG. 1 is a schematic diagram showing a partial structure of a shunt valve for a bidet in the prior art.
Figure 2:
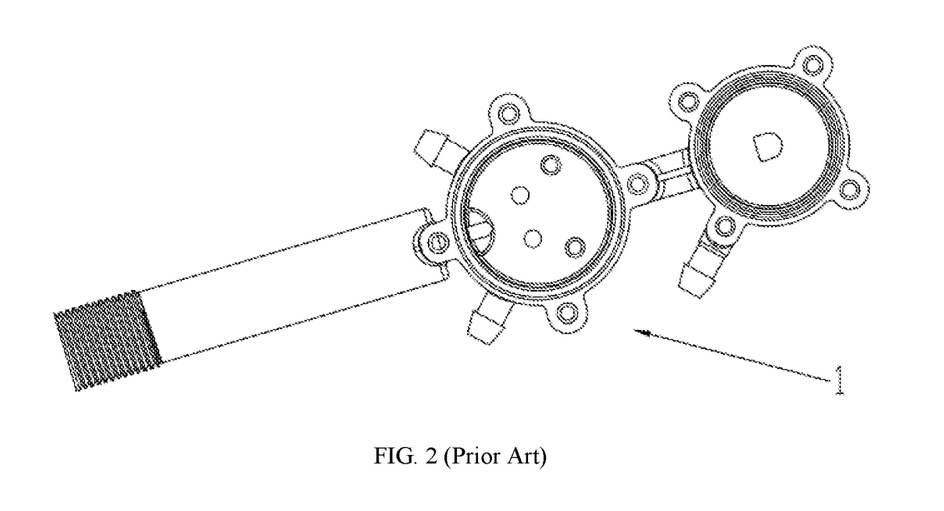
FIG. 2 is a schematic diagram showing the structure of a valve body of the shunt valve for the bidet in the prior art.
Figure 3:
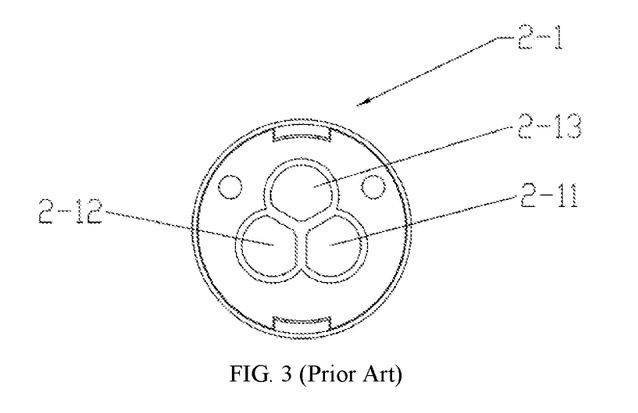
FIG. 3 is a schematic diagram showing the structure of a fixed valve plate of the shunt valve for the bidet in the prior art.

As shown in FIGS. 1-3, prior art shunt valve for a bidet includes the valve body 1, the washing mode valve group 2 and the self-cleaning mode valve group 3. The washing mode valve group 2 is configured to direct and control the on/off function of the feminine and buttock washing water passages. The self-cleaning mode valve group 3 is configured to control the on/off self-cleaning water passage. Referring still to the prior art, both of the two valve groups are independent modules, wherein the fixed valve plate 2-1 of the valve core of the washing mode valve group 2 is provided with the feminine washing water outlet hole 2-11, the buttock washing water outlet hole 2-12 and the water stop portion 2-13. When the movable valve plate (not shown) on the washing mode valve group 2 is located at a middle position, the overflowing hole on the movable valve plate corresponds to the water stop portion 2-13, and the water passage is turned off. When the movable valve plate on the washing mode valve group 2 is rotated 120 degrees in the positive-rotation direction, the overflowing hole on the movable valve plate communicates with the buttock washing water outlet hole 2-12, and the water flows from the buttock washing water passage. When the movable valve plate on the washing mode valve group 2 is rotated 120 degrees in the counter-rotation direction, the overflowing hole on the movable valve plate communicates with the feminine washing water outlet hole 2-11, and the water flows from the feminine washing water passage. When cleaning the nozzle, the washing mode valve group 2 must be closed while the self-cleaning mode valve group 3 is opened, so that the water flows from the nozzle self-cleaning water passage. The prior art shunt valve is difficult to operate effectively, has a complex structure and is expensive to manufacture. It is therefore highly desirable to provide an improved shunt valve for a bidet. The new shunt valve should be easy to operate effectively, have a simple structure and be inexpensive to manufacture.

SUMMARY

In order to solve the above-mentioned problems, the present invention provides a shunt valve for a bidet and a toilet cover plate including the shunt valve. The present invention can achieve water supply and water cut-off, effective washing of the subject human anatomy and self-cleaning of the nozzle through only one valve core, which makes for a simple structure valving device that is easy to operate and assemble and inexpensive to manufacture when compared with the prior art since there are fewer parts.

In order to achieve the above-mentioned objective, the present invention adopts the following technical solution. A shunt valve for a bidet includes a valve body and a valve core. The valve body is provided with a water inlet port and a water outlet port. The valve core includes a movable valve plate and a fixed valve plate, wherein the movable valve plate and the fixed valve plate abut against each other, and are rotatably matched with each other and arranged in an inner cavity of the valve body. The water outlet port includes a washing water outlet port and a self-cleaning water outlet port. The fixed valve plate is provided with a washing water outlet hole communicating with the washing water outlet port and a self-cleaning water outlet hole communicating with the self-cleaning water outlet port. The movable valve plate is provided with an overflowing hole communicating with the water inlet port. When the movable valve plate is rotated, the overflowing hole moves between a water stop position, a washing position and a self-cleaning position. When the overflowing hole is located at the water stop position, the overflowing hole does not correspond to the washing water outlet hole and the self-cleaning water outlet hole to occlude a water passage. When the overflowing hole is located at the washing position, the overflowing hole communicates with the washing water outlet hole. When the overflowing hole is located at the self-cleaning position, the overflowing hole communicates with the self-cleaning water outlet hole.

Preferably, the washing water outlet port includes a feminine washing water outlet port and a buttock washing water outlet port. Correspondingly, the washing water outlet hole includes a feminine washing water outlet hole communicating with the feminine washing water outlet port and a buttock washing water outlet hole communicating with the buttock washing water outlet port.

Preferably, the fixed valve plate is provided with a water stop portion. When the overflowing hole is located at the water stop position, the overflowing hole corresponds to a position of the water stop portion. Two self-cleaning water outlet holes are formed at both sides of the water stop portion, respectively. The feminine washing water outlet hole and the buttock washing water outlet hole are formed at both sides of the water stop portion, respectively. One of the self-cleaning water outlet holes is located between the feminine washing water outlet hole and the water stop portion, and the other self-cleaning water outlet hole is located between the buttock washing water outlet hole and the water stop portion.

Preferably, the two self-cleaning water outlet holes are symmetrically formed at both sides of the water stop portion, respectively; and two buttock washing water outlet holes are symmetrically formed at both sides of the water stop portion, respectively.

Preferably, each of the feminine washing water outlet hole and the buttock washing water outlet hole is an elongated hole. The size of the feminine washing water outlet hole increases gradually along a positive-rotation direction of the movable valve plate, and the size of the buttock washing water outlet hole increases gradually along a counter-rotation direction of the movable valve plate.

Preferably, the shape and the size of the self-cleaning water outlet hole are identical to the shape and the size of the overflowing hole.

Preferably, the valve body includes a valve main body and a valve cover, wherein the valve main body and the valve cover are securely buckled. The valve main body and the valve cover are buckled to form a valve cavity. The valve core is rotatably arranged in the valve cavity. The valve cavity between the water inlet port and the movable valve plate forms a water inlet cavity.

Preferably, the valve core further includes a drive rotary rod drivingly connected to the movable valve plate. One end of the drive rotary rod extends out of the valve cover and the drive rotary rod is driven to drive the movable valve plate to rotate relative to the fixed valve plate.

Preferably, the valve core further includes a valve core housing and a valve core seat connected to each other. The valve core housing and the valve core seat are buckled to form a containing cavity. The movable valve plate, the fixed valve plate and the drive rotary rod are arranged in the containing cavity, and the drive rotary rod extends out of the valve core housing. The fixed valve plate is limited within the valve body through the valve core seat in a circumferential direction. The valve core seat is provided with a through hole respectively matched with each water outlet hole on the fixed valve plate. Water from the each water outlet hole on the fixed valve plate flows to the corresponding water outlet port through the corresponding through hole.

Preferably, a first sealing member is arranged between one side of the valve core seat and the fixed valve plate, and a second sealing member is arranged between the other side of the valve core seat and the valve body. The first sealing member and the second sealing member are configured to allow the water from the each water outlet hole on the fixed valve plate to flow to the corresponding water outlet port independently of each other.

In addition, the present invention further provides a toilet cover plate, including a bidet for washing a human body part. The bidet includes the shunt valve as mentioned above. The washing water outlet port of the shunt valve communicates with a washing pipeline of the bidet, and the self-cleaning water outlet port of the shunt valve communicates with a self-cleaning pipeline of the bidet.

The present invention has the following advantages.

1. The present invention can achieve water supply and water cut-off of the shunt valve, washing of the human body and self-cleaning of the nozzle through a single valve core, which has a simple structure, is easy to operate and assemble and is less expensive to manufacture because it has fewer parts.

2. Two self-cleaning water outlet holes are formed at both sides of the water stop portion, respectively. The feminine washing water outlet hole and the buttock washing water outlet hole are formed at both sides of the water stop portion, respectively. One of the self-cleaning water outlet holes is located between the feminine washing water outlet hole and the water stop portion, and the other self-cleaning water outlet hole is located between the buttock washing water outlet hole and the water stop portion. In this way, the overflowing hole on the movable valve plate passes through the self-cleaning position when moving from the water stop position to the buttock washing position or the feminine washing position, so that before entering a buttock washing mode or feminine washing mode, the bidet performs self-cleaning on the nozzle in advance. In this way, the nozzle can be cleaned in advance for hygienic use, and the residual water in the water passage can be discharged in advance of use to avoid discomfort caused as a result of cold residual water contacting the user.

3. Each of the feminine washing water outlet hole and the buttock washing water outlet hole is an elongated hole. The size of the feminine washing water outlet hole increases gradually along the positive-rotation direction of the movable valve plate, and the size of the buttock washing water outlet hole increases gradually along the counter-rotation direction of the movable valve plate. In this way, the outflow of the water for feminine washing and buttock washing can be adjusted by adjusting the angle of the movable valve plate, which is more convenient to use.

BRIEF DESCRIPTION OF THE DRAWINGS

The drawings described herein are used to provide a further understanding of the present invention and form part of the present invention. The illustrative embodiments of the present invention and descriptions thereof are used to explain the present invention and do not constitute an inappropriate limitation to the present invention.

In the figures.

10—valve body; 10a—valve main body; 10b—valve cover; 11—water inlet port; 12—feminine washing water outlet port; 13—buttock washing water outlet port; 14—self-cleaning water outlet port; 20—valve core; 20a—valve core housing; 20b—valve core seat; 21—fixed valve plate; 211—feminine washing water outlet hole; 212—buttock washing water outlet hole; 213—self-cleaning water outlet hole; 214—water stop portion; 22—movable valve plate; 221—overflowing hole; 23—drive rotary rod; 24—drive rotary rod sealing ring; 25—first sealing member; 26—second sealing member; 27—through hole; 28—movable valve plate fastener.

DETAILED DESCRIPTION OF THE EMBODIMENTS

In order to make the technical problems, technical solutions and advantages clearer, the present invention is further described hereinafter in detail with reference to the drawings and embodiments. It should be understood that the specific embodiments described herein are used only to explain the present invention rather than to limit the present invention.

As shown in FIGS. 4 to 11, according to an embodiment of the present invention, a shunt valve for a bidet includes the valve body 10 and the valve core 20. The valve body 10 is provided with the water inlet port 11 and a water outlet port. The valve core 20 includes the movable valve plate 22 and the fixed valve plate 21. The movable valve plate 22 and the fixed valve plate 21 are arranged in the inner cavity of the valve body 10, abut against each other and are rotatably matched with each other. The water outlet port includes a washing water outlet port and the self-cleaning water outlet port 14. The fixed valve plate 21 is provided with the washing water outlet hole communicating with the washing water outlet port and the self-cleaning water outlet hole 213 communicating with the self-cleaning water outlet port 14. The movable valve plate 22 is provided with the overflowing hole 221 communicating with the water inlet port 11. When the movable valve plate 22 is rotated, the overflowing hole 221 moves between a water stop position, a washing position and a self-cleaning position. When the overflowing hole 221 is located at the water stop position, the overflowing hole 221 does not communicate with the washing water outlet hole and the self-cleaning water outlet hole 213 to occlude the water passage, so that water cannot flow out of the shunt valve. When the overflowing hole 221 is located at the washing position, the overflowing hole 221 communicates with the washing water outlet hole, so that the water flows through the washing water outlet hole to the washing water outlet port to wash a human body part. When the overflowing hole 221 is located at the self-cleaning position, the overflowing hole 221 communicates with the self-cleaning water outlet hole 213, so that the water flows through the self-cleaning water outlet hole 213 to the self-cleaning water outlet port 14 to clean the nozzle (not shown) of the bidet. In this way, the shunt valve can achieve water supply and water cut-off, washing of the human body and self-cleaning of the nozzle through a single valve core 20, which has a simple structure, is easy to operate and assemble, and is cost-saving.

In the present embodiment, the washing water outlet port includes the feminine washing water outlet port 12 and the buttock washing water outlet port 13. Correspondingly, the washing water outlet hole includes the feminine washing water outlet hole 211 communicating with the feminine washing water outlet port 12 and the buttock washing water outlet hole 212 communicating with the buttock washing water outlet port 13. When the overflowing hole 221 communicates with the feminine washing water outlet hole 211, the movable valve plate 22 is located at the feminine washing position. When the overflowing hole 221 communicates with the buttock washing water outlet hole 212, the movable valve plate 22 is located at the buttock washing position.

In the present embodiment, the fixed valve plate 21 is provided with the water stop portion 214. When the overflowing hole 221 is located at the water stop position, the overflowing hole 221 corresponds to the position of the water stop portion 214. Two self-cleaning water outlet holes 213 are symmetrically formed at both sides of the water stop portion 214, respectively. The feminine washing water outlet hole 211 and the buttock washing water outlet hole 212 are symmetrically formed at both sides of the water stop portion 214, respectively. One of the self-cleaning water outlet holes 213 is located between the feminine washing water outlet hole 211 and the water stop portion 214, and the other self-cleaning water outlet hole 213 is located between the buttock washing water outlet hole 212 and the water stop portion 214. In this way, the overflowing hole 221 on the movable valve plate 22 passes through the self-cleaning position when moving from the water stop position to the buttock washing position or the feminine washing position, so that before entering the buttock washing mode or the feminine washing mode, the bidet performs self-cleaning on the nozzle in advance. In this way, the nozzle can be self-cleaned in advance for hygienic use, and the residual water in the water passage can be discharged in advance of use to avoid discomfort caused as a result of cold residual water contacting the user.

In the present embodiment, each of the feminine washing water outlet hole 211 and the buttock washing water outlet hole 212 is an elongated hole. The size of the feminine washing water outlet hole 211 increases gradually along the positive-rotation direction of the movable valve plate 22, and the size of the buttock washing water outlet hole 212 increases gradually along the counter-rotation direction of the movable valve plate 22. A positive-rotation direction can be the clockwise direction, and a counter-rotation direction can be, accordingly, the counterclockwise direction. Alternatively, the positive-rotation direction is the counterclockwise direction, and the counter-rotation direction is, accordingly, the clockwise direction. In this way, the overflowing area where the overflowing hole 221 overlaps with the feminine washing water outlet hole 211 or the buttock washing water outlet hole 212 can be adjusted by adjusting the angle of the movable valve plate 22, so as to adjust the outflow of the water for feminine washing and buttock washing, which is more convenient to use. In the present embodiment, the shape and size of the self-cleaning water outlet hole 213 are identical to the shape and size of the overflowing hole 221.

Figure 4:
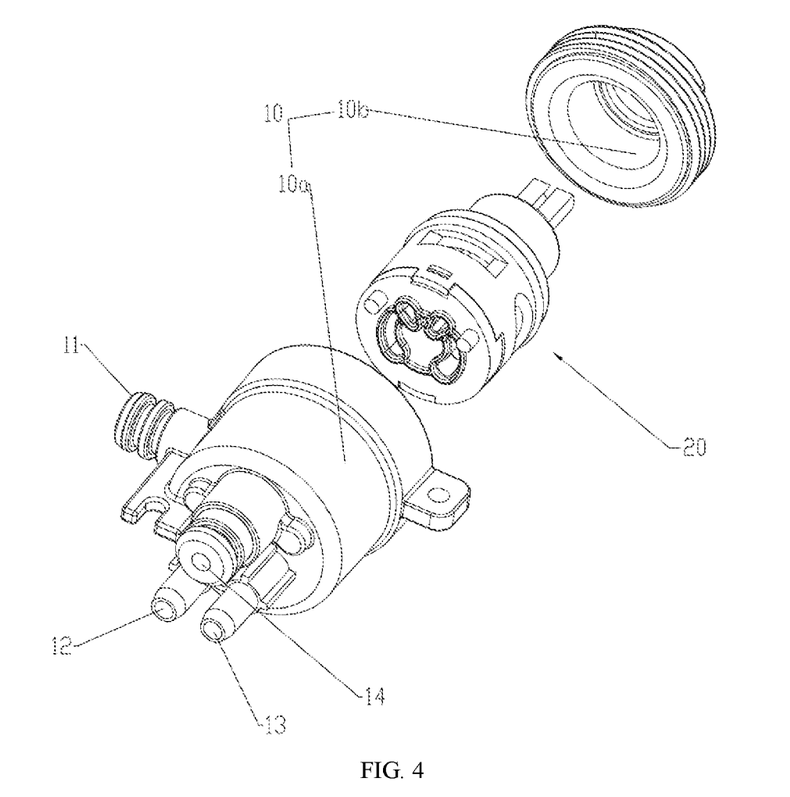
FIG. 4 is a first exploded view of the shunt valve according to an embodiment of the present invention.
Figure 5:
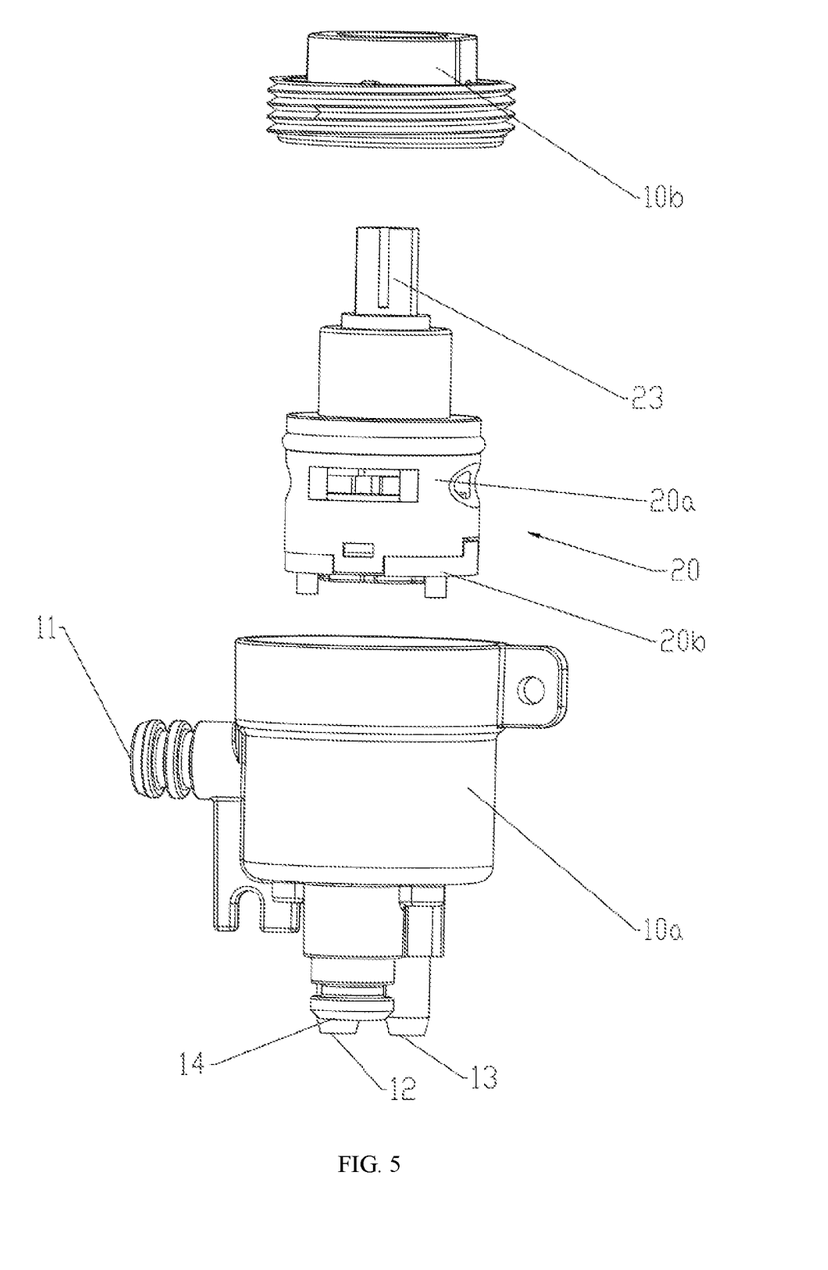
FIG. 5 is a second exploded view of the shunt valve according to an embodiment of the present invention.

In the present embodiment, the valve body 10 includes the valve main body 10*a* and the valve cover 10*b*. The valve main body 10*a* and the valve cover 10*b* are securely buckled to form a valve cavity, and the valve core 20 is rotatably arranged in the valve cavity. The valve cavity between the water inlet port 11 and the movable valve plate 22 forms a water inlet cavity.

Figure 6:
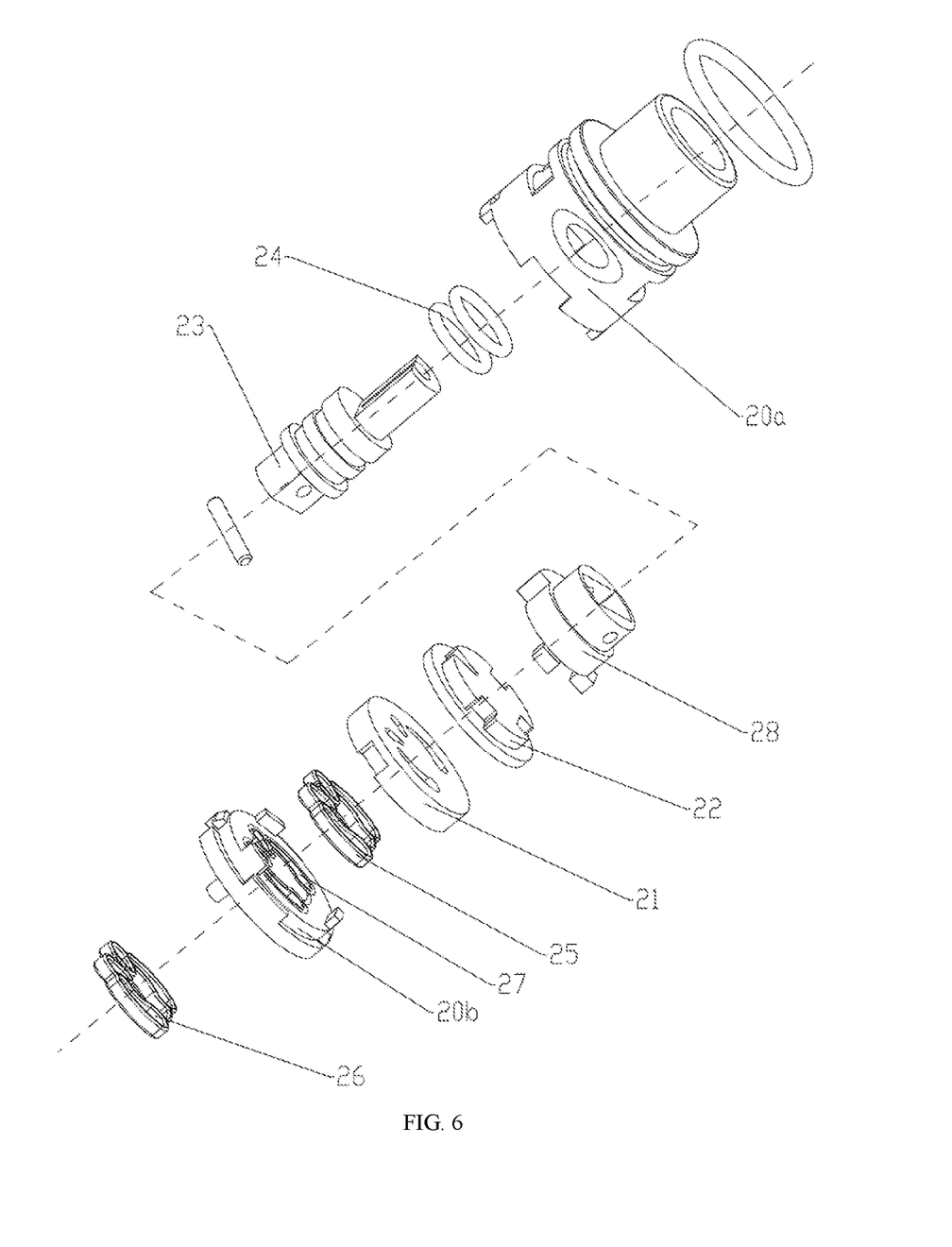
FIG. 6 is a perspective exploded view of the valve core of the shunt valve according to an embodiment of the present invention.

In the present embodiment, the valve core 20 further includes the drive rotary rod 23 drivingly connected to the movable valve plate 22. One end of the drive rotary rod 23 extends out of the valve cover 10*b* and the drive rotary rod 23 is driven to drive the movable valve plate 22 to rotate relative to the fixed valve plate 21. Specifically, the movable valve plate fastener 28 is arranged between the drive rotary rod 23 and the movable valve plate 22. The movable valve plate 22 is matched with the movable valve plate fastener 28 in the circumferential direction, so that the drive rotary rod 23 is driven to drive the movable valve plate 22 to rotate through the movable valve plate fastener 28.

In the present embodiment, the valve core 20 further includes the valve core housing 20a and the valve core seat 20b that are connected to each other. The valve core housing 20a and the valve core seat 20b are buckled to form a containing cavity. The movable valve plate 22, the fixed valve plate 21 and the drive rotary rod 23 are arranged in the containing cavity, and the drive rotary rod 23 extends out of the valve core housing 20a. The drive rotary rod 23 and the valve core housing 20a form a dynamic seal through the drive rotary rod sealing ring 24. The fixed valve plate 21 is limited within the valve body 10 through the valve core seat 20b in the circumferential direction. The valve core seat 20b is provided with the through holes 27 respectively matched with the water outlet holes on the fixed valve plate 21, and the water from each water outlet hole on the fixed valve plate 21 flows to the corresponding water outlet port through the corresponding through hole 27.

In the present embodiment, the first sealing member 25 is arranged between one side of the valve core seat 20b and the fixed valve plate 21, and the second sealing member 26 is arranged between the other side of the valve core seat 20b and the valve body 10. The first sealing member 25 and the second sealing member 26 are configured to allow the water from each water outlet hole on the fixed valve plate 21 to flow to the corresponding water outlet port independently of each other. Each of the first sealing member 25 and the second sealing member 26 employs a gasket structure.

The working principle of the present embodiment is summarized as follows.

Figure 7:
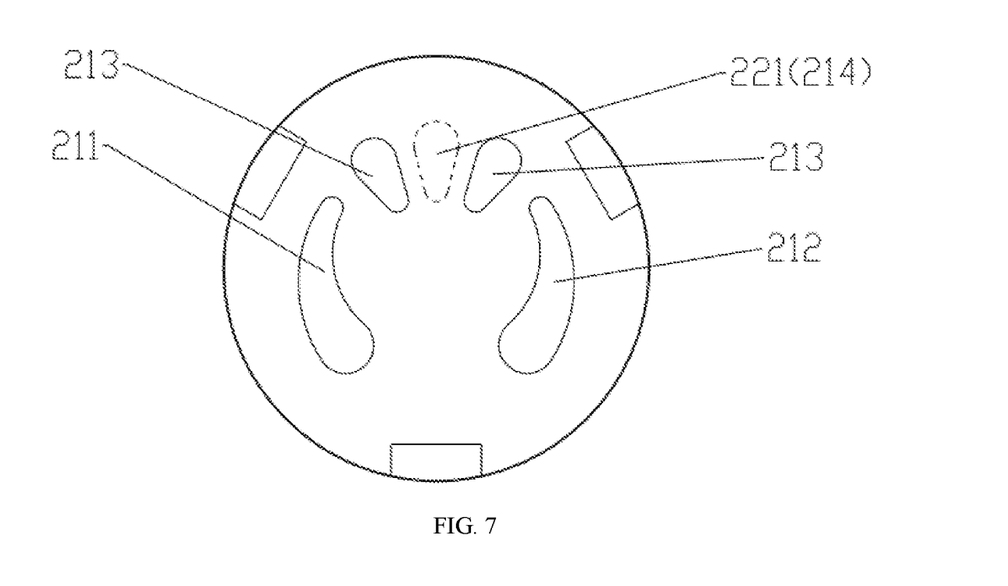
FIG. 7 is a schematic diagram showing the cooperation between the movable valve plate and the fixed valve plate according to an embodiment of the present invention, wherein the overflowing hole is located at the water stop position.

As shown in FIG. 7, in the initial state, the overflowing hole 221 on the movable valve plate 22 is at the water stop position. At this time, the overflowing hole 221 corresponds to the position of the water stop portion 214 on the fixed valve plate 21, and the shunt valve is in the water stop state.

Figure 8:
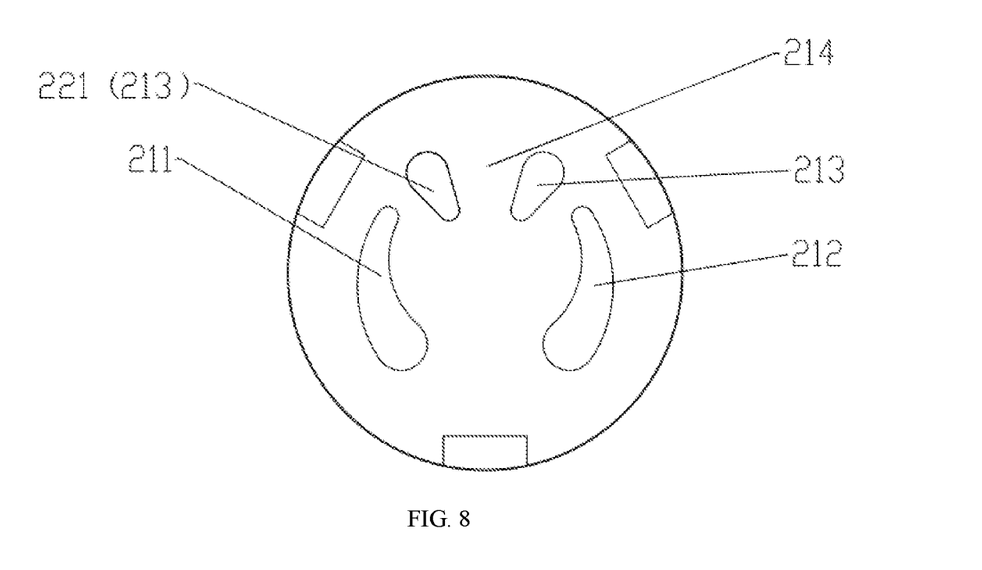
FIG. 8 is a schematic diagram showing the cooperation between the movable valve plate and the fixed valve plate according to an embodiment of the present invention, wherein the overflowing hole is located at the self-cleaning position in the positive-rotation direction.
Figure 9:
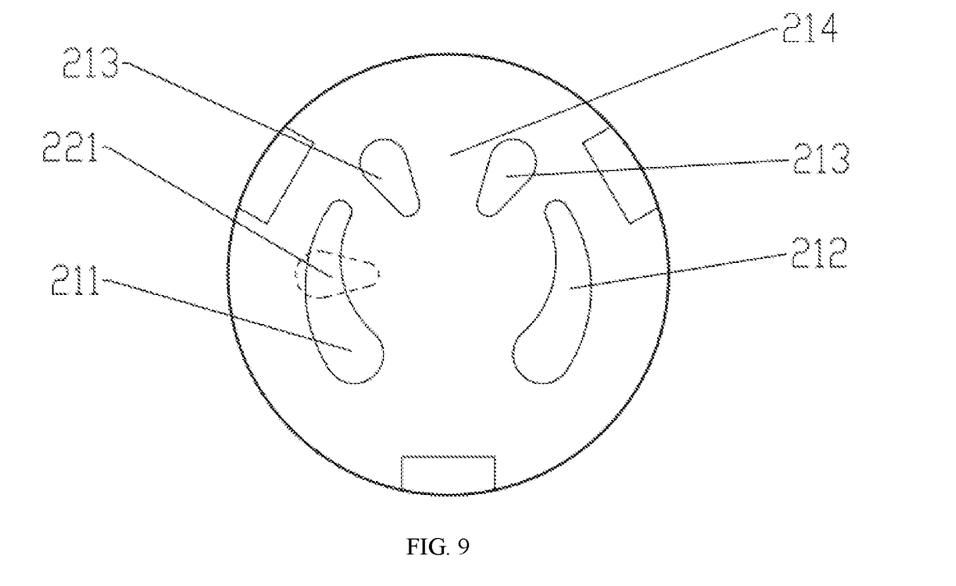
FIG. 9 is a schematic diagram showing the cooperation between the movable valve plate and the fixed valve plate according to an embodiment of the present invention, wherein the overflowing hole is located at the feminine washing position.

As shown in FIGS. 8 and 9, in the feminine washing mode, the drive rotary rod 23 is driven to drive the movable valve plate 22 to rotate in the positive-rotation direction through the movable valve plate fastener 28. The overflowing hole 221 on the movable valve plate 22 is first rotated to the position corresponding to the self-cleaning water outlet hole 213 on the same side as the feminine washing water outlet hole 211 (as shown in FIG. 8), so that the water flows first from the self-cleaning water outlet hole 213 to clean the nozzle of the bidet, and meanwhile, the residual cold water in the water passage of the bidet is discharged. Then, the movable valve plate 22 continues to rotate in the positive-rotation direction to the position where the overflowing hole 221 communicates with the feminine washing water outlet hole 211 (as shown in FIG. 9), and the water flows from the feminine washing water outlet hole 211 and flows out through the feminine washing pipeline of the bidet to wash a human body part.

Figure 10:
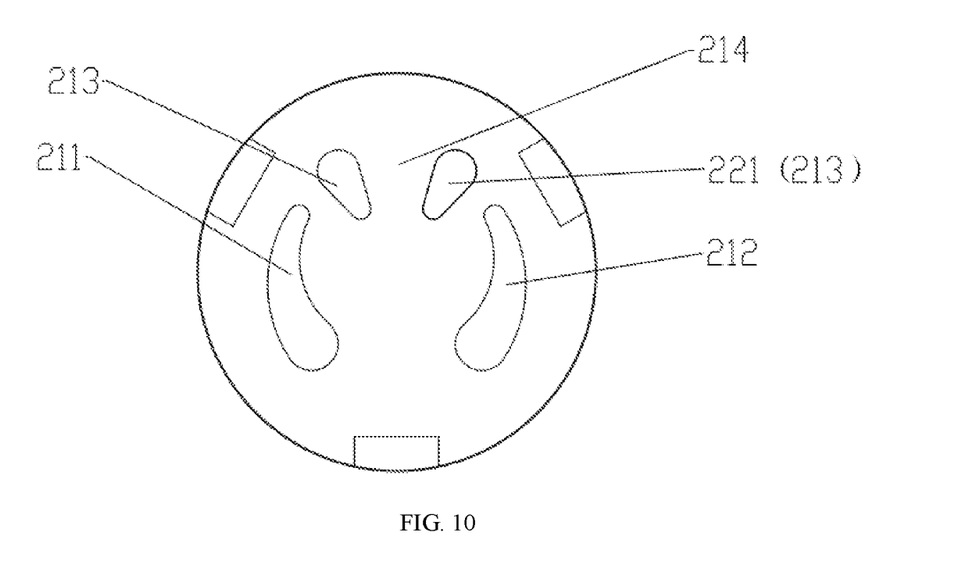
FIG. 10 is a schematic diagram showing the cooperation between the movable valve plate and the fixed valve plate according to an embodiment of the present invention, wherein the overflowing hole is located at the self-cleaning position in the counter-rotation direction.
Figure 11:
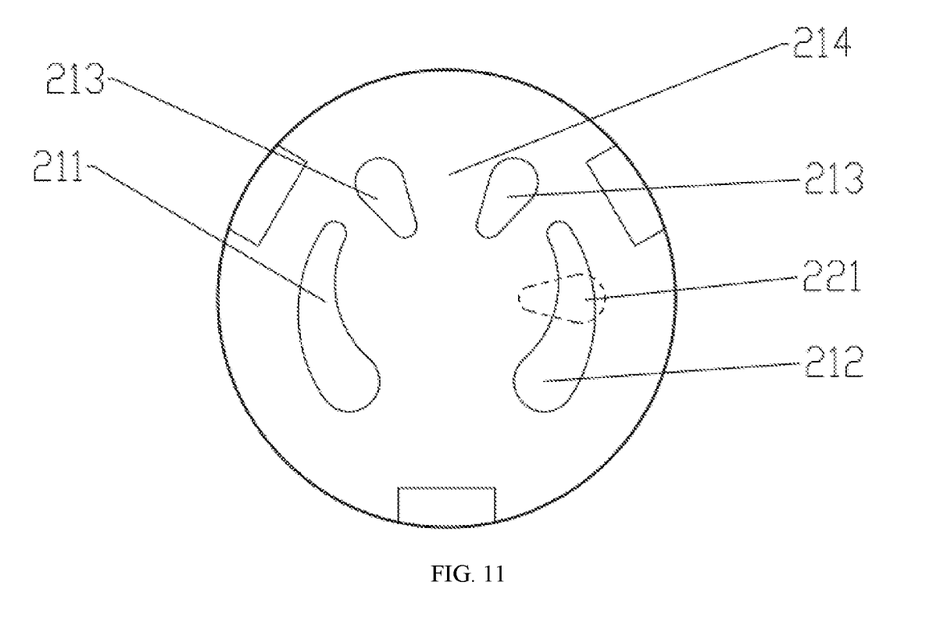
FIG. 11 is a schematic diagram showing the cooperation between the movable valve plate and the fixed valve plate according to an embodiment of the present invention, wherein the overflowing hole is located at the buttock washing position.

As shown in FIGS. 10 and 11, in the buttock washing mode, the drive rotary rod 23 is driven to drive the movable valve plate 22 to rotate in the counter-rotation direction through the movable valve plate fastener 28. The overflowing hole 221 on the movable valve plate 22 is first rotated to the position corresponding to the self-cleaning water outlet hole 213 on the same side as the buttock washing water outlet hole 212 (as shown in FIG. 10), so that the water flows first from the self-cleaning water outlet hole 213 to clean the nozzle of the bidet, and meanwhile, the residual cold water in the water passage of the bidet is discharged. Then, the movable valve plate 22 continues to rotate in the counter-rotation direction to the position where the overflowing hole 221 communicates with the buttock washing water outlet hole 212 (as shown in FIG. 11), and the water flows from the buttock washing water outlet hole 212 and flows out through the buttock washing pipeline of the bidet to wash a human body part.

In addition, the present invention further provides a toilet cover plate (not shown in the figures), including a bidet (not shown in the figures) for washing a human body part. The bidet includes the shunt valve as mentioned above. The washing water outlet port of the shunt valve communicates with a washing pipeline (not shown in the figures) of the bidet to facilitate washing a human body part. The self-cleaning water outlet port 14 of the shunt valve communicates with a self-cleaning pipeline (not shown in the figures) of the bidet to facilitate cleaning the nozzle (not shown in the figures) of the bidet. The structure and principle of the shunt valve can refer to the description of the above embodiment, which will not be repeated herein.

The above description illustrates the preferred embodiments of the present invention. As mentioned above, it should be understood that the present invention is not limited to the form disclosed herein and should not be construed as an exclusion of other embodiments, but can be used in a variety of other combinations, modifications, and environments. In addition, the present invention can be modified through the above teachings or technology or knowledge in the art within the scope of protection of the present invention described herein. Any modification made by those skilled in the art without departing from the spirit and scope of the present invention shall fall within the scope of protection of the claims appended to the present invention.

What is claimed is:

1. A shunt valve for a bidet, comprising a valve body and a valve core; wherein,
　　the valve body is provided with a water inlet port and a water outlet port;
　　the valve core comprises a movable valve plate and a fixed valve plate; wherein,
　　　　the movable valve plate and the fixed valve plate abut against each other, the movable valve plate and the fixed valve plate are rotatably matched with each other and the movable valve plate and the fixed valve plate are arranged in an inner cavity of the valve body;
　　the water outlet port comprises a washing water outlet port and a self-cleaning water outlet port;
　　the fixed valve plate is provided with a washing water outlet hole communicating with the washing water outlet port and a self-cleaning water outlet hole communicating with the self-cleaning water outlet port;
　　the movable valve plate is provided with an overflowing hole communicating with the water inlet port;
　　when the movable valve plate is rotated, the overflowing hole moves between a water stop position, a washing position and a self-cleaning position;
　　when the overflowing hole is located at the water stop position, the overflowing hole does not communicate with the washing water outlet hole and the self-cleaning water outlet hole to occlude a water passage; and
　　when the overflowing hole is located at the washing position, the overflowing hole communicates with the washing water outlet hole; and when the overflowing hole is located at the self-cleaning position, the overflowing hole communicates with the self-cleaning water outlet hole.

2. The shunt valve of claim 1, wherein, the washing water outlet port comprises a feminine washing water outlet port and a buttock washing water outlet port, and the washing water outlet hole comprises a feminine washing water outlet hole communicating with the feminine washing water outlet port and a buttock washing water outlet hole communicating with the buttock washing water outlet port.

3. The shunt valve of claim 2, wherein, the fixed valve plate is provided with a water stop portion; when the overflowing hole is located at the water stop position, the overflowing hole corresponds to a position of the water stop portion; two self-cleaning water outlet holes are formed at both sides of the water stop portion, respectively; the feminine washing water outlet hole and the buttock washing water outlet hole are formed at the both sides of the water stop portion, respectively; a first self-cleaning water outlet hole of the two self-cleaning water outlet holes is located between the feminine washing water outlet hole and the water stop portion, and a second self-cleaning water outlet hole of the two self-cleaning water outlet holes is located between the buttock washing water outlet hole and the water stop portion.

4. The shunt valve of claim 3, wherein, the two self-cleaning water outlet holes are symmetrically formed at the both sides of the water stop portion, respectively; and the feminine washing water outlet hole and the buttock washing water outlet hole are symmetrically formed at the both sides of the water stop portion, respectively.

5. The shunt valve of claim 2, wherein, each of the feminine washing water outlet hole and the buttock washing water outlet hole is an elongated hole; a size of the feminine washing water outlet hole increases gradually along a positive-rotation direction of the movable valve plate, and a size of the buttock washing water outlet hole increases gradually along a counter-rotation direction of the movable valve plate.

6. The shunt valve of claim 1, wherein, a shape and a size of the self-cleaning water outlet hole are identical to a shape and a size of the overflowing hole.

7. The shunt valve of claim 1, wherein, the valve body comprises a valve main body and a valve cover; the valve main body and the valve cover are securely buckled to form a valve cavity, and the valve core is rotatably arranged in the valve cavity; and a part of the valve cavity is between the water inlet port and the movable valve plate, and forms a water inlet cavity.

8. The shunt valve of claim 7, wherein, the valve core further comprises a drive rotary rod drivingly connected to the movable valve plate; one end of the drive rotary rod extends out of the valve cover and the drive rotary rod is driven to drive the movable valve plate to rotate relative to the fixed valve plate.

9. The shunt valve of claim 8, wherein, the valve core further comprises a valve core housing and a valve core seat, and the valve core housing and the valve core seat are connected to each other; the valve core housing and the valve core seat are buckled to form a containing cavity; the movable valve plate, the fixed valve plate and the drive rotary rod are arranged in the containing cavity, and the drive rotary rod extends out of the valve core housing; the fixed valve plate is limited within the valve body through the valve core seat in a circumferential direction; the valve core seat is provided with a through hole respectively matched with each water outlet hole on the fixed valve plate, and water from the each water outlet hole on the fixed valve plate flows to a water outlet port corresponding to the each water outlet hole through the through hole.

10. The shunt valve of claim 9, wherein, a first sealing member is arranged between a first side of the valve core seat and the fixed valve plate, and a second sealing member is arranged between a second side of the valve core seat and the valve body; the first sealing member and the second sealing member are configured to allow the water from the each water outlet hole on the fixed valve plate to flow to the water outlet port corresponding to the each water outlet hole independently of each other.

11. A toilet cover plate, comprising a bidet configured to wash a human body part, wherein, the bidet comprises the shunt valve of claim 1; the washing water outlet port of the shunt valve communicates with a washing pipeline of the bidet, and the self-cleaning water outlet port of the shunt valve communicates with a self-cleaning pipeline of the bidet.

12. The toilet cover plate of claim 11, wherein, the washing water outlet port comprises a feminine washing water outlet port and a buttock washing water outlet port, and the washing water outlet hole comprises a feminine washing water outlet hole communicating with the feminine washing water outlet port and a buttock washing water outlet hole communicating with the buttock washing water outlet port.

13. The toilet cover plate of claim 12, wherein, the fixed valve plate is provided with a water stop portion; when the overflowing hole is located at the water stop position, the overflowing hole corresponds to a position of the water stop portion; two self-cleaning water outlet holes are formed at both sides of the water stop portion, respectively; the feminine washing water outlet hole and the buttock washing water outlet hole are formed at the both sides of the water stop portion, respectively; a first self-cleaning water outlet hole of the two self-cleaning water outlet holes is located between the feminine washing water outlet hole and the water stop portion, and a second self-cleaning water outlet hole of the two self-cleaning water outlet holes is located between the buttock washing water outlet hole and the water stop portion.

14. The toilet cover plate of claim 13, wherein, the two self-cleaning water outlet holes are symmetrically formed at the both sides of the water stop portion, respectively; and the feminine washing water outlet hole and the buttock washing water outlet hole are symmetrically formed at the both sides of the water stop portion, respectively.

15. The toilet cover plate of claim 12, wherein, each of the feminine washing water outlet hole and the buttock washing water outlet hole is an elongated hole; a size of the feminine washing water outlet hole increases gradually along a positive-rotation direction of the movable valve plate, and a size of the buttock washing water outlet hole increases gradually along a counter-rotation direction of the movable valve plate.

16. The toilet cover plate of claim 11, wherein, a shape and a size of the self-cleaning water outlet hole are identical to a shape and a size of the overflowing hole.

17. The toilet cover plate of claim 11, wherein, the valve body comprises a valve main body and a valve cover; the valve main body and the valve cover are securely buckled to form a valve cavity, and the valve core is rotatably arranged in the valve cavity; and a part of the valve cavity is between the water inlet port and the movable valve plate, and forms a water inlet cavity.

18. The toilet cover plate of claim 17, wherein, the valve core further comprises a drive rotary rod drivingly connected to the movable valve plate; one end of the drive rotary rod extends out of the valve cover and the drive rotary rod is driven to drive the movable valve plate to rotate relative to the fixed valve plate.

19. The toilet cover plate of claim 18, wherein, the valve core further comprises a valve core housing and a valve core seat, and the valve core housing and the valve core seat are connected to each other; the valve core housing and the valve core seat are buckled to form a containing cavity; the movable valve plate, the fixed valve plate and the drive rotary rod are arranged in the containing cavity, and the drive rotary rod extends out of the valve core housing; the fixed valve plate is limited within the valve body through the valve core seat in a circumferential direction; the valve core seat is provided with a through hole respectively matched with each water outlet hole on the fixed valve plate, and water from the each water outlet hole on the fixed valve plate flows to a water outlet port corresponding to the each water outlet hole through the through hole.

20. The toilet cover plate of claim 19, wherein, a first sealing member is arranged between a first side of the valve core seat and the fixed valve plate, and a second sealing member is arranged between a second side of the valve core seat and the valve body; the first sealing member and the second sealing member are configured to allow the water from the each water outlet hole on the fixed valve plate to flow to the water outlet port corresponding to the each water outlet hole independently of each other.

* * * * *